INVENTOR.
NICK A. SCHUSTER
BY
Campbell, Brumbaugh, Free & Graves
HIS ATTORNEYS.

June 23, 1959

N. A. SCHUSTER 2,891,728

ELECTRONIC COMPUTING APPARATUS FOR COMPUTING A ROOT
OR A POWER OF THE RATIO OF TWO QUANTITIES

Filed April 2, 1953

INVENTOR.
NICK A. SCHUSTER
BY
HIS ATTORNEYS.

United States Patent Office 2,891,728
Patented June 23, 1959

2,891,728

ELECTRONIC COMPUTING APPARATUS FOR COMPUTING A ROOT OR A POWER OF THE RATIO OF TWO QUANTITIES

Nick A. Schuster, Ridgefield, Conn., assignor, by mesne assignments, to Schlumberger Well Surveying Corporation, Houston, Tex., a corporation of Texas Application April 2, 1953, Serial No. 346,497

3 Claims. (Cl. 235—194)

The present invention relates to electronic computers and, more particularly, to new and improved apparatus for continuously computing values of functions involving the ratio of two quantities that can be represented by corresponding electrical potentials.

The applicant's copending application Serial No. 292,073, filed June 6, 1952, for "Well Logging Methods and Apparatus," now United States Patent No. 2,770,771, issued November 13, 1956, of which the present application is a continuation in part, discloses electrical well logging systems in which the electrical resistivity of earth formations traversed by a well is accurately determined by continuously computing values of a function involving the ratio of two potential differences picked up by apparatus lowered into the well. Numerous other procedures in geophysical prospecting also require computations of the value of a function involving a ratio, such as, for example, the conversion of electrical resistivity values to electrical conductivities, the determination of formation porosities from electrical resistivity values, etc. It is highly desirable to provide apparatus for continuously computing the values of functions of this general character. However, in order to be useful in the field, such apparatus must be relatively simple yet accurate and dependable.

It is an object of the invention, accordingly, to provide new and improved electronic apparatus for computing values of a function involving the ratio of two quantities that can be represented electrically.

Another object of the invention is to provide new and improved computer apparatus of the above character which is capable of computing the values of functions involving the ratio of two quantities in combination with other quantities.

A further object of the invention is to provide novel computer apparatus of the above character which includes means for computing values of a function involving a root or a power of the ratio of two quantities.

Broadly speaking, computer apparatus according to the invention comprises variable gain amplifying means the gain of which is adjusted as a function of the ratio of two quantities that can be represented by corresponding electrical signals. Specifically, one of the two signals in its original form is combined in opposition with the other signal after amplification in the amplifying means to produce a difference signal which is utilized to adjust the gain of the amplifying means to reduce the difference signal to zero. In this way the gain of the amplifying means is made a function of the ratio of the two signals. Thus, when a third electric signal of separably different character from the first two signals is fed to the amplifying means, the output of the latter will be a function of the product of the third signal and the ratio of the first and second signals. Depending upon the values of the three signals, multiplication and/or division may be effected. Further, this product may be combined with other electric signals by algebraic addition or subtraction, for example.

A further embodiment, in accordance with the invention, utilizes a plurality of variable gain amplifiers in series relation to compute powers and roots of the ratio of two quantities that can be represented by electric signals.

The invention will be understood more completely by reference to the following detailed description taken in conjunction with the accompanying drawings, in which.

Figure 1:
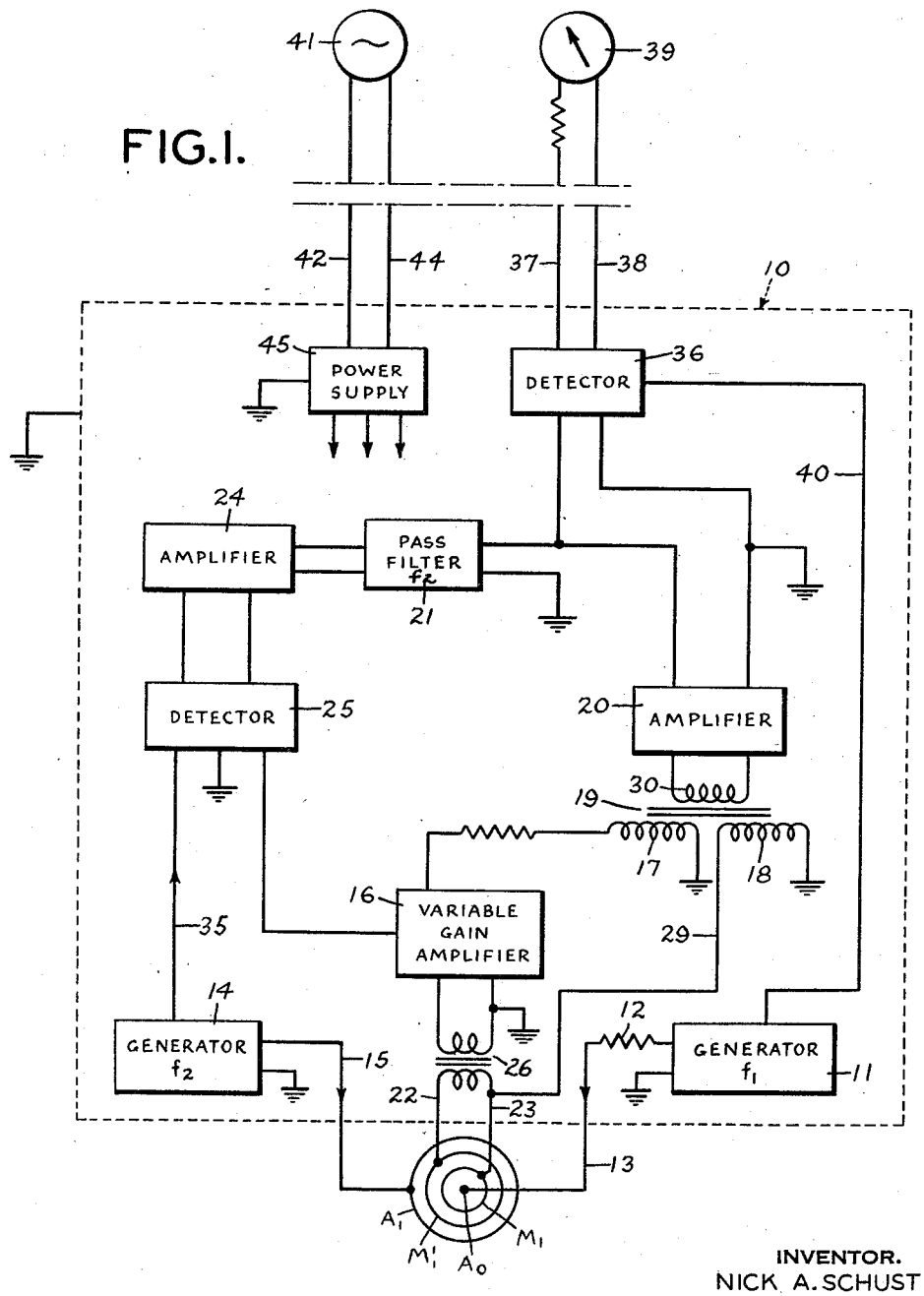
Fig. 1 is a schematic diagram of an electronic computer constructed in accordance with the invention.

While the computer apparatus of the invention is susceptible of general utility, several of the embodiments thereof will be disclosed by way of illustration as receiving signal outputs from geophysical prospecting apparatus, which signal outputs represent quantities involved in a particular function whose value is to be computed. Thus, in Fig. 1, computer apparatus 10 according to the invention is connected to receive signal outputs from an electrical logging electrode array which may be of the type disclosed in the aforementioned copending application. The computer may be at the surface of the earth or in a pressure-resistant housing adapted to pass through the bore hole with the electrode array.

The details of the electrical logging system are given in full in the aforementioned copending application Serial No. 292,073 and it will not be necessary to include them herein. Suffice it to say that the electrode array comprises a central current emitting electrode $A_0$, two concentric potential pickup electrodes $M_1$ and $M_{1'}$ and another concentric current emitting electrode $A_1$. A constant-frequency generator 11 is adapted to supply preferably constant current at a frequency $f_1$ to the center electrode $A_0$ through a high impedance 12 and an insulated conductor 13. The low impedance terminal of the generator 11 is connected to a ground. A second generator 14 is adapted to supply current at a frequency $f_2$ to the outer electrode $A_1$ over a conductor 15.

When the electrode array is disposed in the conducting liquid in a well, there will be between the electrodes $M_1$ and $M_{1'}$ a potential difference $e_1'$ at the frequency $f_1$ and a potential difference $e_2'$ at the frequency $f_2$. Between the electrode $M_1$ and ground, there will exist a potential difference $e_1$ at the frequency $f_1$ and a potential difference $e_2$ at the frequency $f_2$. Taking the electrode $M_1$ as a reference point, the phase or polarity of the potential $e_2'$ is opposite (or negative) to that of the potential $e_2$, while the potential $e_1'$ will be of like phase or polarity with the potential $e_1$.

As explained in the abovementioned copending application Serial No. 292,073, the electrical resistivity $R$ of the earth formations at the level of the electrode array in the well is accurately given by the relation $$R \alpha e_1 + \frac{(e_2)(e_1')}{(e_2')} \tag{1}$$

This value of $R$ may be computed continuously from this relation by means of the computer apparatus 10 shown in Fig. 1.

The computer 10 comprises a variable gain amplifier 16, whose overall gain G is controlled in accordance with the difference between the voltages of a given frequency appearing across the primary windings 17 and 18 of a transformer 19 through the action of a feedback loop comprising an amplifier 20, a filter 21, a further amplifier 24 and a detector 25 connected in series. The potential differences $e_1'$ and $e_2'$ are supplied through the conductors 22 and 23 and an isolation transformer 26 to the input of the variable gain amplifier 16. The primary winding 17 of the transformer 19 is connected in the output circuit of the amplifier 16 so that it receives the output signals $Ge_1'$ and $Ge_2'$ from the latter. The primary winding 18 of the transformer 19 is connected between ground and the electrode $M_1$ by means of the conductors 23 and 29, so that it receives the potentials $e_1$ and $e_2$. The potentials $e_1$ and $e_2$ may be obtained from the electrode $M_1'$, if desired, without changing the resistivity value subsequently computed.

In so far as the frequency $f_2$ is concerned, the combined signal applied to the amplifier 20 by means of a secondary winding 30 of the transformer 19 is proportional to $e_2 - Ge_2'$, since $e_2'$ is negative. This signal is transmitted by the filter 21 which substantially eliminates signals of the frequency $f_1$. The filtered signal is amplified in the amplifier 24 and rectified in the detector 25, which is preferably made phase-sensitive to the frequency $f_2$ by applying a reference potential of the same frequency from the generator 14 over a conductor 35. A direct potential proportional to $e_2 - Ge_2'$ is applied to the gain control circuits of the amplifier 16 with such polarity as to tend to cancel the combined signal of the frequency $f_2$ applied to the amplifier 20. This causes the potential $Ge_2'$ across the winding 17 to be equal and opposite to the potential $e_2$ across the winding 18. Accordingly, the gain G of the variable gain amplifier 16 will be continuously equal to $$\frac{e_2}{e_2'}$$

The variable gain amplifier 16 must be constructed to have a gain at the frequency $f_1$ that is proportional to the gain at the frequency $f_2$. Specifically, the proportionality factor must be unity to satisfy the Relation 1. With this gain equal to $$\frac{e_2}{e_2'}$$

consider now the effect of current of the frequency $f_1$ on the computer circuit. The signal applied across the winding 18 will be equal to $e_1$, and the signal applied across the winding 17 will be equal to $Ge_1'$. Thus, the signal at the input of the amplifier 20 will be continuously proportional to the algebraic sum of the two signals, or $e_1 + Ge_1'$. Since $$G = \frac{e_2}{e_2'}$$

the signal applied to the amplifier 20 is made continuously proportional to $$e_1 + \left(\frac{e_2}{e_2'}\right)e_1'$$

which is the same as the Relation 1 above-mentioned. Thus, since signals of the frequency $f_2$ are substantially eliminated, the output signal from the amplifier 20 is a potential of the frequency $f_1$ which is proportional to the resistivity value R defined by Relation 1 above.

The output signal from the amplifier 20 may be applied to a linear detector 36 through a filter (not shown) passing only the frequency $f_1$, if desired. The detected voltage may be sent to the surface of the earth by means of insulated cable conductors 37 and 38 to a high impedance recording galvanometer 39 which preferably makes a record of the resistivity R as a function of the depth of the electrode array in the bore hole. The detector 36 is preferably made phase selective by the insertion of a reference potential at the frequency $f_1$ applied over a conductor 40 from the generator 11.

All of the electrical power necessary to operate the electronic equipment in the computer 10, may, for example, be supplied by a conventional power supply 45 connected through insulated conductors 42 and 44 to an alternating voltage generator 41 at the surface of the earth.

Figure 2:
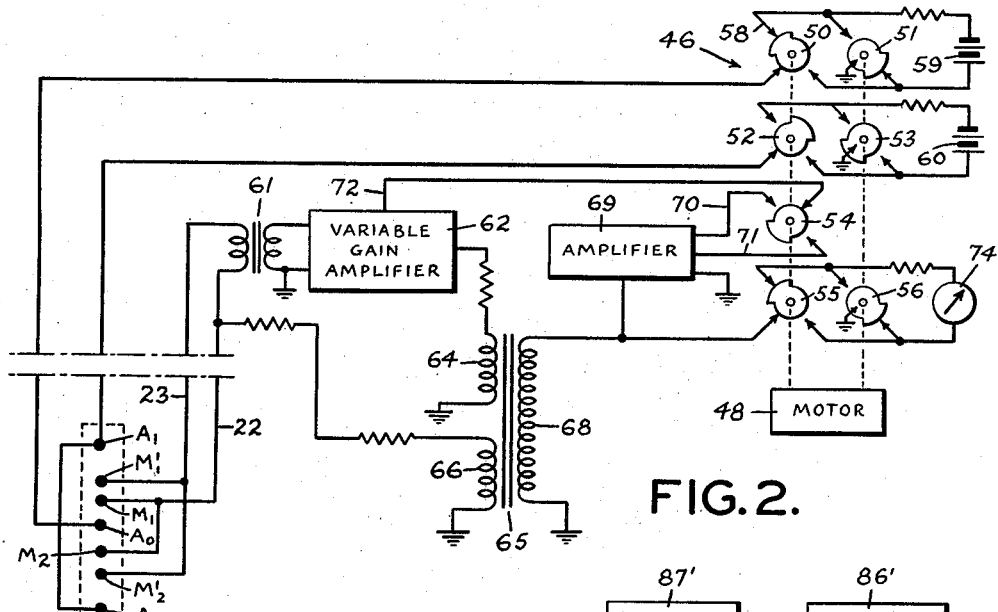
Fig. 2 illustrates schematically a modification of the computer shown in Fig. 1, which functions on a time-division basis instead of a frequency separation basis as in Fig. 1.

Fig. 2 illustrates a modification which utilizes time-division methods in its operation instead of frequency separation. In Fig. 2, a rotary switch 46 driven by motive means 48, such as an electric motor, for example, controls the operational sequence of the resistivity computer to generate and detect four significant potentials which are combined to yield a single resultant signal indicative of the desired resistivity measurement. The switch 46 is illustrated as comprising a plurality of conductive wafers 50—56 which make continuous or intermittent sliding connection with face-wiping resilient contact arms, such as a contact arm 58. The wafers are mounted on and insulated from a common shaft which simultaneously rotates the same.

The switch wafers 50 and 51 are adapted to supply, between the electrode $A_0$ and the ground, a current of alternate polarity during alternate quarter cycles of the switch 46 from a direct current source 59. During the intermediate quarter cycles, the switch wafers 52 and 53 are adapted to supply a current of alternate polarity between the electrodes $A_1$ and $A_2$, and ground potential from a direct current source 60.

The conductors 22 and 23 from the electrodes $M_1$ and $M_2$, and $M_1'$ and $M_2'$, respectively, are connected to an isolation transformer 61, the secondary winding of which is connected across the input of a variable gain amplifier 62, similar to the amplifier 16 of Fig. 1. During alternate quarter cycles, potentials equal to $e_1'$ and $e_2'$ are applied to the amplifier 62, and the amplified signal is supplied to a primary winding 64 of a transformer 65. The transformer 65 corresponds to the transformer 19 of Fig. 1 and includes a further primary winding 66 across which potentials equal to $e_1$ and $e_2$ are applied during alternate quarter cycles. During even quarter cycles, a potential proportional to $e_1 + Ge_1'$ and, during odd quarter cycles, a potential proportional to $e_2 - Ge_2'$ appears across the secondary winding 68 of the transformer 65.

The secondary winding 68 is connected both to the input of an amplifier 69 and to the switch wafer 55. The output circuit of the amplifier 69 is balanced with respect to the ground and provides two output conductors 70 and 71 on which the output signals appear with opposite polarity. The conductors 70 and 71 are alternately connected to a switch wafer 54 which applies a rectified control potential over a lead 72 to the gain control circuit of the amplifier 62 only during the odd quarter cycles. The gain G of the amplifier 62 is accordingly made substantially equal to the ratio $$\frac{e_2}{e_2'}$$

and the control circuit has sufficient time delay to maintain this gain unchanged during the even quarter cycles when $e_1'$ is being applied to the amplifier 62.

The switch wafers 55 and 56 serve to supply a rectified signal to a meter 74, only during the even quarter cycles. It is thus observed that a direct potential proportional to the aforementioned relation may be continuously recorded by the meter 74 as a function of the depth of the electrode array in the bore hole.

Figure 3:
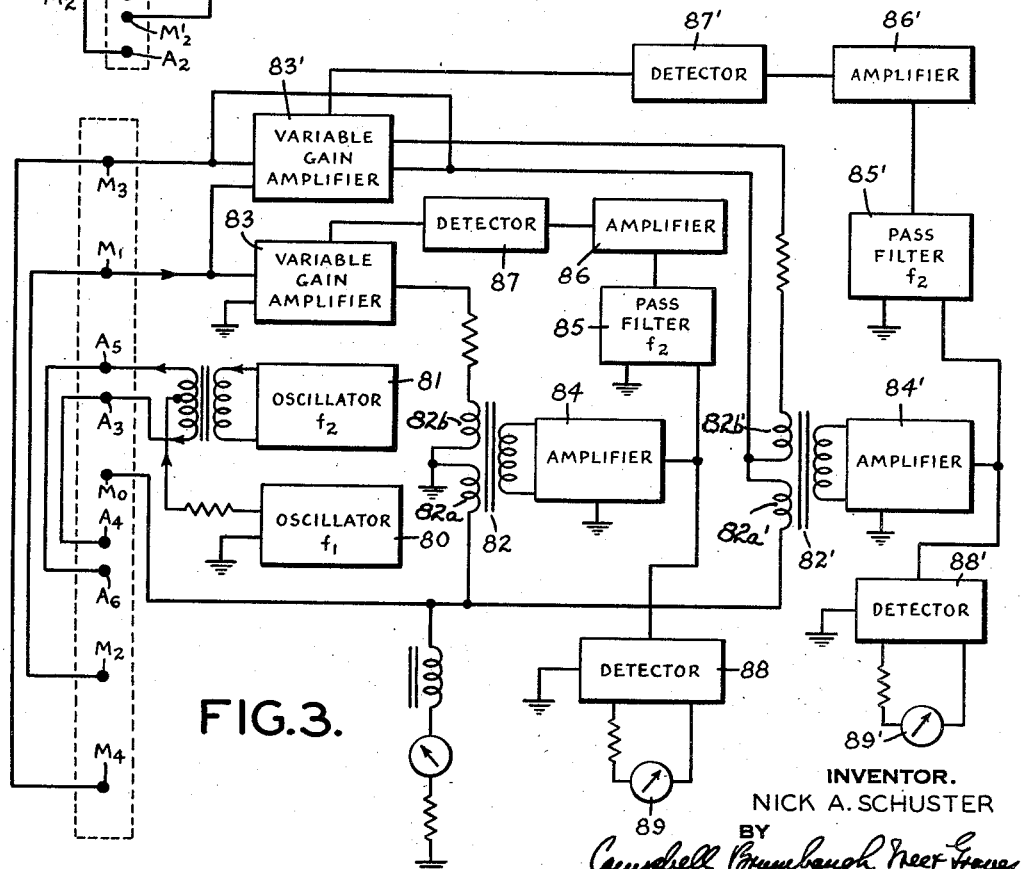
Fig. 3 is a schematic diagram of a further embodiment of the invention.

Fig. 3 is a circuit diagram of a modification of the invention for obtaining a plurality of resistivity values from electric signals developed in an electrical logging system of the type disclosed in the copending application Serial No. 282,579, filed April 16, 1952, for "Electrical Well Logging," by Maurice C. Ferre, now United States Patent No. 2,712,631, issued July 5, 1955. The electrical logging system is fully disclosed in the applicant's copending application Serial No. 292,073, and it need not be described in detail herein.

In Fig. 3, current of the frequency $f_1$ is supplied from an oscillator 80 between the electrodes $A_3$ and $A_4$, $A_5$ and $A_6$, and ground potential. Current of the frequency $f_2$ is supplied from an oscillator 81 between the electrodes $A_3$ and $A_5$ and between the electrodes $A_4$ and $A_6$. Signals corresponding to potential differences of frequencies $f_1$ and $f_2$, respectively, between the electrode $M_0$ and a reference point at ground potential, are applied to the primary winding 82a of the transformer 82. Similarly, signals corresponding to potential differences of frequencies $f_1$ and $f_2$, respectively, between the electrodes $M_1$ and $M_2$ and a reference point at ground potential are amplified by the variable gain amplifier 83 and fed to the primary winding 82b of the transformer 82. As in the several forms of the invention described above, the gain of the variable gain amplifier 83 is controlled by the feedback path through the amplifier 84, the filter 85 which is responsive to the frequency $f_2$, a further amplifier 86, and the detector 87. A further detector 88 is connected to the output of the amplifier 84 and supplies a signal to a recording galvanometer 89, corresponding to one resistivity value.

Simultaneously, signals corresponding to potential differences of the frequencies $f_1$ and $f_2$, respectively, between the electrode $M_0$ and the electrodes $M_3$ and $M_4$, are applied to the primary winding 82a' of the transformer 82', while signals corresponding to potential differences of frequencies $f_1$ and $f_2$, respectively, between the electrodes $M_1$ and $M_2$ and the electrodes $M_3$ and $M_4$ are amplified by the variable gain amplifier 83' and fed to the primary winding 82b' of the transformer 82'. The gain of the variable gain amplifier 83' is controlled by the feedback path through the amplifier 84', the filter 85' which is responsive to the frequency $f_2$, a further amplifier 86', and the detector 87'. A further detector 88' is connected to the output of the amplifier 84' and supplies a signal to a recording galvanometer 89' corresponding to the resistivity R' of a different effective current path.

Figure 4:
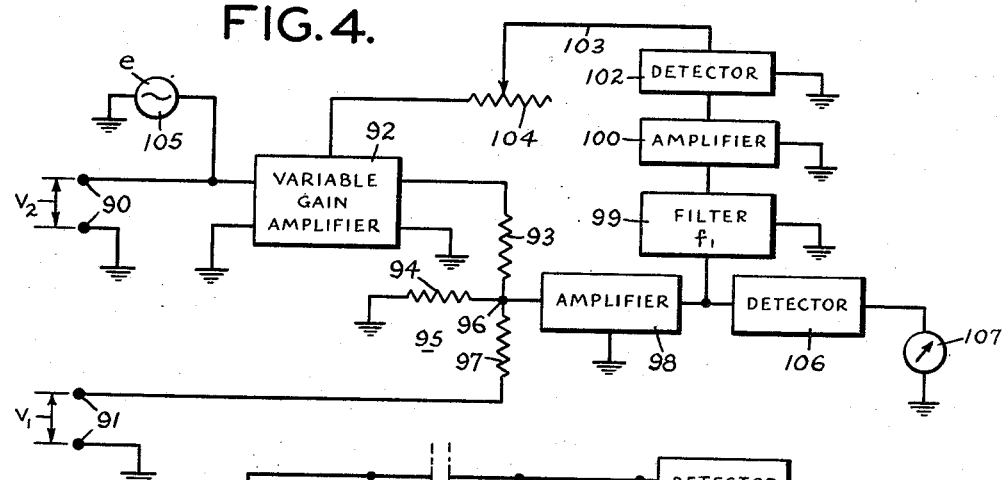
Fig. 4 illustrates a form of the invention adapted to compute the ratio of two quantities.

In Fig. 4, is shown a modification which is adapted to provide an electrical output which varies directly as the ratio of two electrical signal amplitudes $V_1$ and $V_2$. The signals $V_1$ and $V_2$ must be of the same frequency and phase when inserted into the input terminals 90 and 91 of the computer. If the two signals are not initially of the same frequency and/or phase, their amplitudes must first be converted by any conventional means, as, for example, by two synchronized demodulator-modulator circuits (not shown), to two signals $V_1$ and $V_2$ of the same frequency $f_1$ and of the same phase, each having amplitudes varying in the same proportion as the respective amplitudes of the initial input signals. Preferably, A.C. signals should be employed so as to avoid the difficulty of obtaining controllable variable gain D.C. amplifiers.

In Fig. 4 the signal $V_2$ of frequency $f_1$ is applied to the input of a variable gain amplifier 92, the output $GV_2$ of which is applied across the resistors 93 and 94 of a resistor network 95. Alternatively, a transformer network may be employed as shown, for example, in Fig. 1. The signal $V_1$, of the same frequency $f_1$ and the same phase as $V_2$ is applied across the resistors 97 and 94, and thus the potential across the resistor 94 at the junction 96 is continuously proportional to $V_1+GV_2$. This signal may be amplified, if desired, by a constant gain amplifier 98, passed through a filter 99 adapted to pass only signals of frequency $f_1$, again amplified, if desired, by an amplifier 100, and detected by a detector 102 providing a D.C. output on the conductor 103 varying in proportion to $V_1+GV_2$. This D.C. signal, which may be initially adjusted by a variable resistor 104, is employed to control the gain of the variable gain amplifier 92. The gain G is controlled such that at the junction 96, $GV_2$ is made continuously substantially equal to $-V_1$, so that the signal applied to the amplifier 98 approaches zero, whereby $$G = -\frac{V_1}{V_2}$$

Since amplifying means (e.g. the amplifying means 98 and 100) may be employed in the control circuit, it will be noted that $GV_2=-V_1$ may be substantially realized.

A unit signal e of a frequency $f_2$ may be applied by a source 105 to the input of the variable gain amplifier 92. As a result, there is developed across the resistor 94, a signal which varies in proportion to $eG$. But $$G = -\frac{V_1}{V_2}$$

and thus at the terminal 96 and in the output of the amplifier 98 there will be a signal of the frequency $f_2$ which varies in proportion to $$e\left(\frac{V_1}{V_2}\right)$$

This signal may be detected by a detector 106 and indicated by a meter 107 which may be calibrated to read directly in terms of $$\frac{V_1}{V_2}$$

since e is a unit signal. Of course, the ratio output signal need not be indicated, but may be employed in subsequent electrical circuits, as desired. The detectors 102 and 106 may be made phase sensitive, if desired, by the introduction of reference signals of the frequencies $f_1$ and $f_2$, respectively, thereinto.

If, in Fig. 4, the signal $V_1$ is a constant-intensity unit signal, the output of the computer will be proportional to the reciprocal $1/V_2$. This reciprocal computer may be employed, for example, to convert continuously the conductivity indications obtained in accordance with the Patent No. 2,582,314, issued January 15, 1952, to H. G. Doll, for "Electromagnetic Well Logging Systems," for example, to resistivity values, since the latter are the reciprocal of the former.

Figure 5:
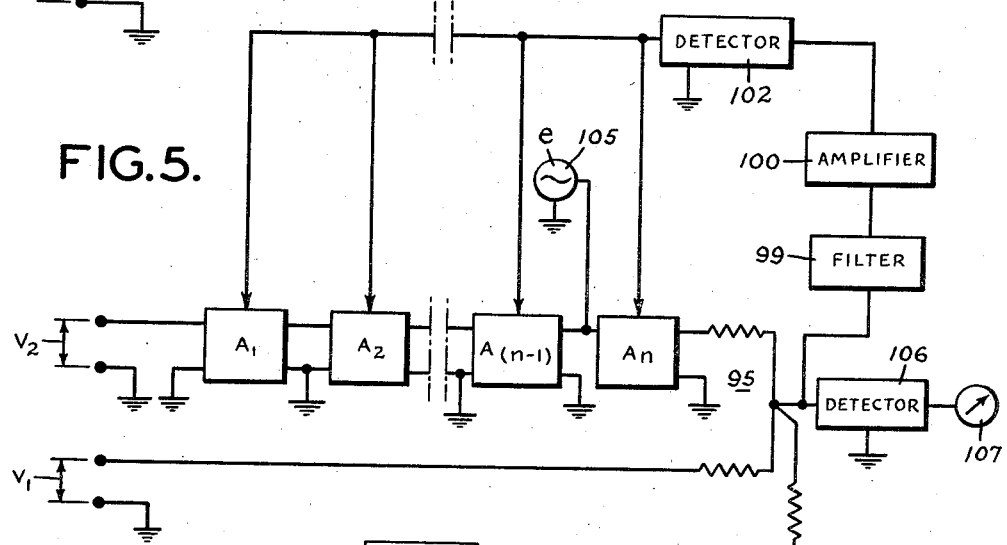
Fig. 5 is a schematic diagram of another embodiment which is capable of computing any root of the ratio of two quantities.

In Fig. 5, there is shown a modification of the computing circuit of Fig. 4 for obtaining a signal continuously proportional to any root, or power less than one, of the ratio of two input signals or of the reciprocal of one input signal. In Fig. 5, numerical designations, the same as those in Fig. 4, represent similar circuit components. In lieu of the variable gain amplifier 92, "n" variable gain amplifiers $A_1 \ldots A_n$ having the same characteristics are inserted in series. The overall gain of these amplifiers is G, and the gain control of each of the amplifiers, in accordance with the invention, is similar to that described in relation to the circuit of Fig. 4, whereby $$G = -\frac{V_1}{V_2}$$

Thus, the gain of the nth amplifier $$A_n \text{ is } \left(-\frac{V_1}{V_2}\right)^{1/n}$$

The unit signal e may be fed into the input of the variable gain amplifier $A_n$, and thus, the output at the meter 107 is proportional to $$e\left(\frac{V_1}{V_2}\right)^{1/n}$$

More generally, if there are n amplifiers and the unit signal is inserted into the mth amplifier, counting back from and including the last amplifier, the output will be proportional to $$\left(\frac{V_1}{V_2}\right)^{m/n}$$

For example, in five ($n=5$) amplifiers are employed and $e$ is inserted in the next to the last amplifier ($m=2$), the output will be proportional to $$\left(\frac{V_1}{V_2}\right)^{2/5}$$

If $V_1$ is maintained constant, any root of the reciprocal $1/V_2$ is obtained, or if $V_2$ is maintained constant, the root of $V_1$ is obtained. For example, the relation between the electrical resistivity R of an earth formation and its porosity P has the following form:

$$P \alpha \sqrt{\frac{1}{R}}$$

Thus, if the quantity R is fed into a two stage computer for obtaining the square root ($n=2$; $m=1$) of a reciprocal as disclosed in Fig. 5, a quantity proportional to $$\sqrt{\frac{1}{R}}$$

will be registered by the meter 107.

Figure 6:
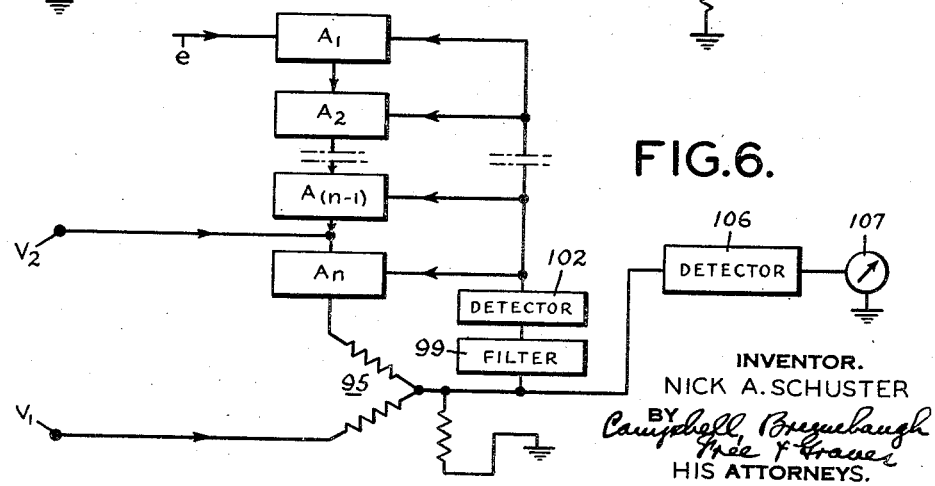
Fig. 6 illustrates a further modification adapted to compute any power of the ratio of two quantities.

Fig. 6 illustrates a further modification which is adapted to provide a signal continuously proportional to any power of the ratio of two input signals or of the reciprocal of one input signal, where "$n$" is an integer. In Fig. 6, "$n$" amplifiers $A_1 \ldots A_n$ in series are employed, each having a gain G. The signal $V_2$ may, for example, be fed into the $n$th amplifier $A_n$, whereby the gain of each amplifier is controlled to have a value $$G = \frac{V_1}{V_2}$$

the total amplification being $$\left(\frac{V_1}{V_2}\right)^n$$

The unit signal $e$ is fed into the first amplifier $A_1$ and thus an indication is obtained of a quantity proportional to $$\left(\frac{V_1}{V_2}\right)^n$$

More generally, if $n$ amplifiers are employed, and the signal $V_2$ is inserted in the $m$th amplifier from the last, a quantity proportional to $$\left(\frac{V_1}{V_2}\right)^{n/m}$$

will be obtained. Obviously, if $V_1$ is maintained constant, a power of the reciprocal of $V_2$ will be obtained, or if $V_2$ is maintained constant, a power of $V_1$ will be obtained.

The invention thus provides novel and highly effective computer apparatus which is capable of providing an output signal varying as a function of (1) the ratio of two signal amplitudes, or (2) the reciprocal of one signal amplitude, or (3) a power or root of the ratio of two signal amplitudes, one of which may be constant, if desired.

It will be obvious to those skilled in the art, that the disclosed embodiments are merely exemplary and that they are susceptible of modification and variation without departing from the spirit and scope of the invention as defined in the appended claims.

I claim:

1. In electronic computer apparatus, the combination of a plurality of tandem connected amplifying means, gain control means for each of said amplifying means, means supplying a first voltage representing a first quantity as an input to one of said amplifying means, means supplying a separably different unit voltage as an input to another of said amplifying means, means providing a third voltage similar to the first representing another quantity, signal combining means having first input means connected to receive the final output of said plurality of amplifying means, second input means connected to receive said third voltage and having output means, feedback means responsive to the first and third voltages coupling the output means of said signal combining means to the gain control means of said plurality of amplifying means, and utilization means connected to receive a signal component in the output of said signal combining means.

2. Electronic computer apparatus as defined in claim 1 in which the first voltage supplying means is connected to supply said first voltage as an input to the first one of said amplifying means, whereas the unit voltage supplying means is connected to supply unit voltage as an input to one of said amplifying means other than the first.

3. Electronic computer apparatus as defined in claim 1 in which the unit voltage supplying means is connected to supply unit voltage as an input to the first one of said amplifying means, whereas said first voltage supplying means is connected to supply said first voltage as an input to one of said amplifying means other than the first.

References Cited in the file of this patent

UNITED STATES PATENTS

| | | |
|---|---|---|
| 2,400,326 | Wolf | May 14, 1946 |
| 2,425,405 | Vance | Aug. 12, 1947 |
| 2,497,883 | Harris | Feb. 21, 1950 |
| 2,558,430 | Goldberg | June 26, 1951 |
| 2,560,170 | Gray | July 10, 1951 |

OTHER REFERENCES

"Waveforms" (Chance, Hughes et al. of M.I.T. Radiation Laboratory). McGraw-Hill Co., Inc. 1949, pages 635–636 and 674 to 676.